(12) United States Patent
Lee et al.

(10) Patent No.: US 7,463,467 B2
(45) Date of Patent: Dec. 9, 2008

(54) RELAY-TO-RELAY DIRECT COMMUNICATION SYSTEM AND METHOD IN AN ELECTRIC POWER SYSTEM

(75) Inventors: Tony J. Lee, Pullman, WA (US); David J. Dolezilek, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 527 days.

(21) Appl. No.: 11/211,816

(22) Filed: Aug. 25, 2005

(65) Prior Publication Data
US 2005/0280965 A1 Dec. 22, 2005

Related U.S. Application Data

(63) Continuation-in-part of application No. 09/900,098, filed on Jul. 6, 2001, now Pat. No. 6,947,269.

(51) Int. Cl.
*H02H 3/00* (2006.01)
(52) U.S. Cl. ............................................. 361/64; 361/81
(58) Field of Classification Search .................... 361/64
See application file for complete search history.

(56) References Cited

U.S. PATENT DOCUMENTS

| | | | |
|---|---|---|---|
| 4,551,718 A | 11/1985 | Cookson | |
| 4,620,257 A | 10/1986 | Sano | |
| 4,899,383 A * | 2/1990 | Einolf et al. | 370/510 |
| 4,935,837 A | 6/1990 | Sun | |
| 4,972,290 A | 11/1990 | Sun | |
| 5,069,521 A * | 12/1991 | Hardwick | 385/24 |
| 5,267,231 A | 11/1993 | Dzieduszko | |
| 5,371,736 A | 12/1994 | Evan | |
| 5,680,324 A | 10/1997 | Schweitzer, III | |
| 5,793,750 A | 8/1998 | Schweitzer, III et al. | |
| 5,838,525 A | 11/1998 | Ward | |
| 5,982,595 A * | 11/1999 | Pozzuoli | 361/62 |
| 6,005,759 A | 12/1999 | Hart | |

(Continued)

OTHER PUBLICATIONS

Translation of Siemen letter dated Jun. 14, 2004 to EPO Munich in opposition to EP 0810714.

(Continued)

*Primary Examiner*—Michael J Sherry
*Assistant Examiner*—Lucy Thomas
(74) *Attorney, Agent, or Firm*—Eugene M. Cummings, P.C.

(57) ABSTRACT

Provided is a system relay-to-relay direct communication system and method in a power system. The relay-to-relay direct communication system includes a first protective relay having a first transmit module where the first transmit module includes a first microcontroller adapted to provide a plurality of data channels. Each of the plurality of data channels is associated with channel data having a variety of bit-lengths. The relay-to-relay direct communication system also includes a second protective relay directly coupled to the first protective relay via a communication link. The second protective relay includes a first receive module where the first receive module including a second microcontroller adapted to provide the plurality of data channels. A speed of receipt of the channel data by the first receive module is adjustable based on an assignment of the channel data to the plurality of data channels of the first transmit module.

29 Claims, 3 Drawing Sheets

U.S. PATENT DOCUMENTS

| | | | |
|---|---|---|---|
| 6,160,806 A * | 12/2000 | Cantwell et al. | ............ 370/360 |
| 6,469,629 B1 | 10/2002 | Campbell | |
| 6,633,998 B1 | 10/2003 | Lau | |
| 6,795,789 B2 | 9/2004 | Vandiver | |
| 2002/0006199 A1 | 1/2002 | Sako | |
| 2002/0080091 A1 | 6/2002 | Acharya | |
| 2002/0173927 A1 | 11/2002 | Vandiver | |
| 2005/0276133 A1 | 12/2005 | Harding | |
| 2005/0280965 A1 | 12/2005 | Lee | |
| 2006/0095507 A1 | 5/2006 | Watson | |

OTHER PUBLICATIONS

7SD512 V3 Digitaler Stromvergleichsschutz fur Leitungen, Geratehandbuch der Siemens AG, 1995 Order No. C53000-G1100-C105-1.

European Patent Application No. EP 0 554 553 A2.

A Numerical Current Comparison Protection With Digital Measured Value Transmission Over Fibre Optic Cable, Koch et al., Southern African Confernece on Power System Protection, Sep. 1991.

A New Approach to Digital Current Differential Protection for Low and Medium Voltage Feeder Circuits Using a Digital Voice-Frequency Grade Communications Channel, Redfern et al., IEEE Transactions on Power Delivery 9 (1994) Jul., No. 3, New York, U.S.

European Patent Application No. EP 0 175 120 B2.

U.S. Appl. No. 08/546,477, dated 1995.

Withdrawal application for U.S. Appl. No. 08/546,477, dated 1995.

Confimation from a customer (Eskom) of Siemens AG from South Africa.

Delivery note for current comparison protection devices 7SD512 dated Feb. 1996.

Statutory Declaration by Mr. Staasmeier.

Acceptance report on 7SD512 apparatus (take-over report dated Nov. 27, 1996).

Schweitzer Engineering Laboratories, Inc., SEL-2505 Remote I/O Module—Reduce operating time, add self-testing, and simplify wiring for auxiliary inputs and outputs. www.selinc.com.

* cited by examiner

US 7,463,467 B2

RELAY-TO-RELAY DIRECT COMMUNICATION SYSTEM AND METHOD IN AN ELECTRIC POWER SYSTEM

RELATED APPLICATIONS

This application is a continuation-in-part of U.S. patent application Ser. No. 09/900,098 entitled "RELAY-TO-RELAY DIRECT COMMUNICATION SYSTEM IN AN ELECTRICAL POWER SYSTEM", filed Jul. 6, 2001 now U.S. Pat. No. 6,947,269, and is related to U.S. Pat. No. 5,793,750 entitled "SYSTEM OF COMMUNICATING OUTPUT FUNCTION STATUS INDICATIONS BETWEEN TWO OR MORE POWER SYSTEM PROTECTIVE RELAYS", issued Aug. 11, 1998.

BACKGROUND OF THE INVENTION

1. Field of the Invention

This invention relates generally to communication systems in an electric power system, and more specifically to a relay-to-relay direct communication system and method in an electric power system.

2. Description of Related Art

In U.S. Pat. No. 5,793,750, the contents of which are hereby incorporated by reference, a communication system between two microprocessor-based protective relays for an electric power system is disclosed. Each of the two relays in that system has both transmit and receive modules, for directly transmitting indication status bits indicative of the result of selected protective functions of one relay from that one relay to the other, and vice versa.

The output status indication bits are sometimes used to identify the existence and location of a fault on the power line portion served by the two relays. One or both of the relays might initiate a circuit breaker trip action on the basis of the exchange of such information. The output status indication bits may be the result of processing functions in one of the relays involving the voltages and/or currents on the power line. The output status indication bits may be used for various control, status, indication and protection functions. Examples of protection functions include permissive overreaching transfer trip (POTT) actions, permissive under-reaching transfer trip (PUTT) actions, directional comparison unblocking (DCUB) and direct transfer trip (DTT) actions. Other relay-to-relay operations are possible using particular output status indication bits.

The advantage of the communication system described in the '750 application is that it is fast and secure. Protective relays typically accomplish their monitoring functions several times each power system cycle. The '750 communication system provides the results of these monitoring functions of one relay, to the other relay. The information is transmitted directly over a communications link from an originating relay which may or may not trip its associated circuit breaker based on its operational results, to another relay. The receiving relay then uses the transmitted information, in the form of digital bits, to perform its own on-going calculations, producing various protection actions such as tripping and closing a circuit breaker when appropriate. The communication between the two relays may be bidirectional, allowing the two relays to exchange information concerning the results of their own calculations both quickly and securely, with a minimum amount of expense.

In the '750 application, the output status indication capability is eight bits. In many cases, however, eight channels are not necessary. For example, two or three bits are usually sufficient to accomplish the desired relay-to-relay protection, control, and monitoring scheme. A substantial number of bits therefore may go unused. The present invention makes use of those otherwise unused bits. It forms a serial data stream or channel from each unused bit, and utilizes those serial data channels to significantly increase the amount of information that can be communicated between the two relays. This invention may utilize none, some or all of the eight channels to transfer output status indication bits. If less than all eight channels are used for output status indication bits, the otherwise unused channels may be used to transfer other selected information.

BRIEF SUMMARY OF THE INVENTION

In an embodiment, provided is a relay-to-relay direct communication system in a power system. The relay-to-relay direct communication system includes a first protective relay having a first transmit module where the first transmit module includes a first microcontroller adapted to provide a plurality of data channels. Each of the plurality of data channels is associated with channel data having a variety of bit-lengths. The relay-to-relay direct communication system also includes a second protective relay directly coupled to the first protective relay via a communication link. The second protective relay includes a first receive module where the first receive module includes a second microcontroller adapted to provide the plurality of data channels. A speed of receipt of the channel data by the first receive module is adjustable based on an assignment of the channel data as a plurality of serial messages to the plurality of data channels of the first transmit module.

In another embodiment, provided is a relay-to-relay direct communication system in a power system. The relay-to-relay direct communication system includes a first protective relay having a first transmit module where the first transmit module includes a first microcontroller adapted to provide a plurality of data channels. Each of the plurality of data channels is associated with channel data having a variety of bit-lengths. The relay-to-relay direct communication system also includes a second protective relay directly coupled to the first protective relay via a communication link. The second protective relay includes a first receive module where the first receive module includes a second microcontroller adapted to provide the plurality of data channels. The communication link is adapted to transmit a plurality of serial messages at a predicable rate where each of the plurality of serial messages is formed using channel data bits corresponding to the channel data. Each of the first and second microcontrollers is further adapted to provide communication link monitoring capability via detection of corrupted serial messages and missing serial messages of the plurality of serial messages, and to calculate communication link availability based on a number of the corrupted and missing serial messages during a time period.

In a further embodiment, provided is a relay-to-relay direct communication system in a power system. The relay-to-relay direct communication system includes a first protective relay having a first transmit module where the first transmit module includes a first microcontroller adapted to provide a plurality of data channels. Each of the plurality of data channels is associated with channel data having a variety of bit-lengths. The relay-to-relay direct communication system also includes a second protective relay directly coupled to the first protective relay via a communication link. The second protective relay includes a first receive module where the first receive module includes a second microcontroller adapted to provide the plurality of data channels. The communication link is adapted to transmit a plurality of serial messages at a predictable rate, each of the plurality of serial messages formed using channel data bits corresponding to the channel data. A speed of receipt of the channel data by the first receive module is adjustable based on an assignment of the channel data to the plurality of data channels of the first transmit module. Each of the first and second microcontrollers is further adapted to provide communication link monitoring capability via detection of corrupted serial messages and missing serial messages of the plurality of serial messages, and to calculate communication link availability based on a number of the corrupted and missing serial messages during a time period.

In yet another embodiment, provided is a method for calculating communication link availability in a relay-to-relay direct communication system in a power system. The relay-to-relay direct communication system has a first protective relay including a first microcontroller that is adapted to provide a plurality of data channels and has a second protective relay directly coupled to the first protective relay via a communication link. The second protective relay includes a second microcontroller that is adapted to provide the plurality of data channels where each of the plurality of data channels is associated with channel data having a variety of bit-lengths. The method includes converting the channel data into a plurality of serial messages, transmitting, via the communication link, each of the plurality of serial messages at a predictable rate, determining an aggregate number of received uncorrupted serial messages, and dividing the aggregate number of serial messages received during a time period by a number serial messages expected to be received during the time period.

DETAILED DESCRIPTION OF THE INVENTION

As indicated above, the present invention is based on and is an improvement of the communication system of U.S. Pat. No. 5,793,750, which includes a direct communication link between two protective relays serving an electric power apparatus, the system supporting a communication arrangement or protocol involving eight data channels for exchange of output status indication bits between the two relays both quickly and securely. The channel data bits TMB1-TMB8 identify eight transmit bits, on eight data channels.

Those bits, when received by the other relay, are identified as received channel data bits RMB1-RMB8, wherein RMB1-RMB8 are the "mirror" or replica of the transmit channel data bits. The eight data channels can accommodate at least eight output status indication bits. As indicated above, however, in many two-relay arrangements, only two or perhaps three channels are necessary to communicate the output status indication bits. Utilizing the present invention, the otherwise vacant channel space may now be used by selected additional data (discussed below) and an associated synchronization channel to synchronize the additional data.

The additional data may be digitized analog quantities, such as metering data, or may be "virtual terminal" data. In a virtual terminal arrangement, a human user or another application utilizes the direct communication link to communicate with the other relay. For example, the human user could utilize the direct communications link to control or query the other relay. An application such as, for example, an integration protocol like as DNP3, could also utilize the communications link in the virtual terminal arrangement.

Figure 1:
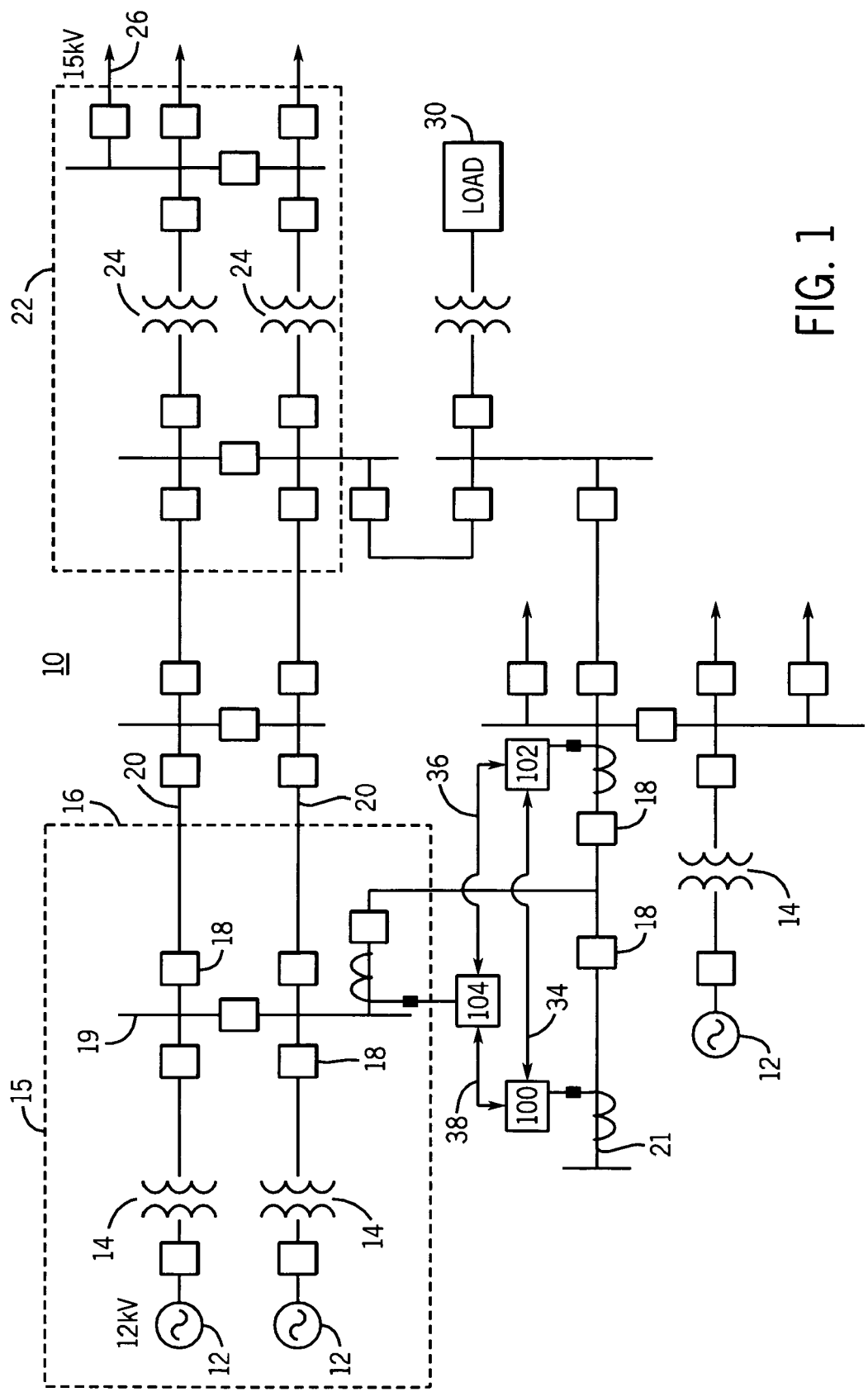
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, two generators 12 configured to generate three-phase sinusoidal waveforms, for example, three-phase 12 kV sinusoidal waveforms, two step-up power transformers 14 configured to increase the 12 kV sinusoidal waveforms to a higher voltage such as 138 kV and a number of circuit breakers 18. The step-up power transformers 14 provide the higher voltage sinusoidal waveforms to a number of long distance transmission lines such as the transmission lines 20. In an embodiment, a first substation 16 may be defined to include the generators 12, the step-up transformers 14 and the circuit breakers 18, all interconnected via a first bus 19. At the end of the long distance transmission lines 20, a second substation 22 includes step-down power transformers 24 to transform the higher voltage sinusoidal waveforms to lower voltage sinusoidal waveforms (e.g., 15 kV) suitable for distribution via a distribution line to various end users 26 and loads 30.

As previously mentioned, the power system 10 includes protective devices and procedures to protect the power system elements from faults or other abnormal conditions The protective devices and procedures utilize a variety of protective logic schemes to determine whether a fault or other problem exists in the power system 10. For example, some types of protective relays utilize a current differential comparison to determine whether a fault exists in the protection zone. Other types of protective relays compare the magnitudes of calculated phasors, representative of the power system sinusoidal waveforms, to determine whether a fault exists in the protection zone. Frequency sensing techniques and harmonic content detection is also incorporated in protective relays to detect fault conditions. Similarly, thermal model schemes are utilized by protective relays to determine whether a thermal problem exists in the protection zone.

Referring again to FIG. 1, also included are a first and a second protective relay 100 and 102 adapted to provide for example, overcurrent protection for the transmission line 21. As described below, the first and second protective relays 100, 102 are also adapted to communicate via a communication link 34 that may be configured using one of a number of suitable media. Additional protective relays such as a protective relay 104, adapted to communicate with the first protective relay 100 and/or the second protective relay 102, may also be included in the power system 10.

Figure 2:
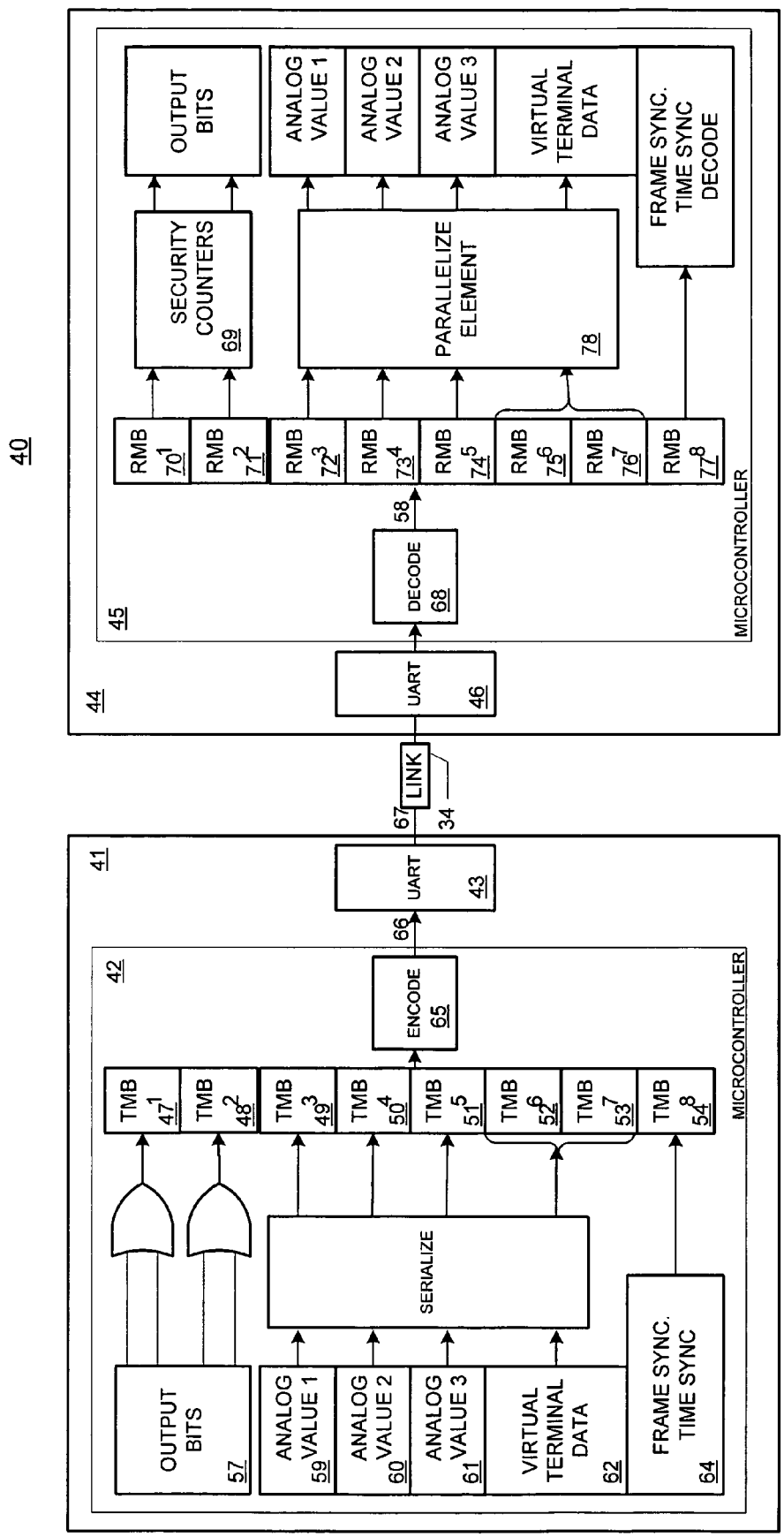
FIG. 2 is a block diagram of a relay-to-relay direct communication system of the power system of FIG. 1, according to an embodiment of the invention.

FIG. 2 is a block diagram of a relay-to-relay direct communication system 40 of the power system 10, according to an embodiment of the invention. Although illustrated using the first and second protective relays 100, 102, it should be understood that the relay-to-relay direct communication system 40 may include additional protective relays operatively coupled to the first and/or second relay 100, 102 and adapted to operate as described below. Further, although illustrated using the first and second protective relays 100, 102, it should be understood that the apparatus and method described herein is applicable communication between to any intelligent electronic device (IED) of the power system 10.

For ease of discussion, the first protective relay 100 is shown as the transmitting relay and includes, inter alia, a "transmit" module 41, having a microcontroller 42 operatively coupled to a receive and transmit interface means; in this example, a universal asynchronous receiver/transmitter (UART) 43. The (transmitting) UART 43 is configured to convert bytes of channel data bits (corresponding to the channel data) resulting from first protective relay operation into a single serial message stream for outbound transmission via the communication link 34 to the second protective relay 102, and to convert an inbound serial message stream (from the second protective relay 102) into bytes of channel data suitable for use by the first protective relay 100.

Similarly, the second protective relay 102 is shown as the receiving relay and includes, inter alia, a "receive" module 44 having a second microcontroller 45 operatively coupled to another UART 46, operational and configured as described above. Although not separately illustrated, each of the first and second protective relays 100, 102 include both transmit and receive capability to enable bidirectional communication. While illustrated as transmit and receive modules 41, 44, in a functional block diagram format, the relay-to-relay direct communication system and method described herein may be enabled via a microprocessor or field programmable gate array (FPGA) executing a computer program, protection algorithm or relay logic scheme. Further, although illustrated as a UART 43 operatively coupled to the first microcontroller 42, and a UART 46 operatively coupled to the second microcontroller 45, one of any suitable transmit and receive interface means may be utilized to convert bytes of channel data bits into a serial message stream for transmission via the communication link 34.

The transmit module 41 and the receive module 44 are operatively connected via the communication link 34. As noted above, the communication link 34 may be enabled as an RF link, a microwave link, an audio link, a fiber optic link, or another other type of suitable link adapted to carry serial data. As illustrated, in addition to output status indication bits, each of the transmit and receive modules 41, 44 is capable of transmitting/receiving other types of channel data in the form of serial messages. For example, the channel data may include digitized analog values, derived from analog quantities, that require more than a single bit such as metering information, breaker failure system security enhancement information, reclose enable information, instrument transformer checking and multi-terminal fault location information, to name a few.

Referring to the transmit module 41, an eight data channel arrangement is configured such that two data channels, a data channel 47 and a data channel 48, correspond to the conventional output status indication bits 57 transmitted as channel data bit 1 (TMB1) and TMB2, respectively, from the transmit module 41 of the first protective relay 100 to the receive module 44 of the second protective relay 102. Three data channels, a data channel 49, a data channel 50 and a data channel 51, are dedicated to digitized analog values 59, 60 and 61 transmitted as channel data bits TMB3, TMB4 and TMB5, respectively, from the transmit module 41 of the first protective relay 100 to the receive module 44 of the second protective relay 102.

Each of the digitized analog values 59, 60, 61 are formed by, for example, converting a 32-bit floating point number representing an analog quantity (e.g., system impedances, currents, voltages)) into an 18-bit floating point number. The 18-bit floating point number is then serialized such that one bit from each of the digitized analog values 59, 60, 61 is included as channel data bits TMB3, TMB4 and TMB5, respectively, in sequential transmitted messages until all of the bits associated with the digitized analog values 59, 60, 61 are transmitted. For example, if each of the digitized analog values 59, 60, 61 is expressed in 18 bits, eighteen sequential serial messages are transmitted where the first serial message includes the first bit of the digitized analog value 59 transmitted as channel data bit TMB3, the first bit of the digitized analog value 60 transmitted as channel data bit TMB4, and the first bit of the digitized analog value 61 transmitted as channel data bit TMB5. Similarly, the second serial message includes the second bit of the digitized analog value 59 transmitted as channel data bit TMB3, the second bit of the digitized analog value 60 transmitted as channel data bit TMB4, and the second bit of the digitized analog value 61 transmitted as channel data bit TMB5, and so on.

It should be noted that while compromising some precision, the conversion scheme that converts a 32-bit floating point number (representing the analog quantity) into a corresponding 18-bit floating point number, enables quicker transmission to the second protective relay 102. It should also be noted that other conversion schemes may be utilized depending on the analog quantity measured, the precision required, and the speed of transmission desired.

Two additional data channels, a data channel 52 and a data channel 53 facilitate virtual terminal data transmitted as channel data bits TMB6 and TMB7, respectively, from the transmit module 41 of the first protective relay 100 to the receive module 44 of the second protective relay 102. As noted above, virtual terminal data refers to data provided by a user located at a local relay (e.g., the first relay 100), to a remote relay (e.g., the second relay 102) via the communication link 34. In such a configuration, the local relay operates as a virtual terminal to allow the user to query and/or control the remote relay with the familiar serial port user interface passing data on otherwise unused channels. The virtual terminal scheme also adds fast meter/operate capability. Like the digitized analog values described above, the virtual terminal data is serialized bit-by-bit such that, for example, 18-bit virtual terminal data is transmitted bit-by-bit in 18 sequential serial messages where the first two bits are payload flags and the last sixteen bits are two 8-bit data bytes. For example, the 18-bit virtual terminal data may be expressed as: $p_1 p_2 d_{16} d_{15} d_{14} d_{13} d_{12} d_{11} d_{10} d_9 d_8 d_7 d_6 d_5 d_4 d_3 d_2{}_{d1}$ where $p_1=1$ indicates that $d_1$-$d_8$ is a payload byte, $p_2=1$ indicates that $d_9$-$d_{16}$ is a payload byte (see, FIG. 3).

The eighth data channel 54 is dedicated to synchronization information transmitted as channel data bit TMB8 from the transmit module 41 of the first protective relay 100 to the receive module 44 of the second protective relay 102. The synchronization information enables synchronization of the data channels associated with the analog values 59, 60, 61 and the virtual terminal data 62. Thus, when any of the data channels 47-53 are used for anything other than the output status indication bits, a dedicated synchronous channel is allocated for synchronization information transmitted as channel data bit TMB8.

Although illustrated utilizing an eight data channel arrangement, it should be understood that a different number or arrangement and/or assignment of data channels may be used by the first and second protective relays 100, 102 of the communication system 40. Accordingly, the two data channels of output status indication bits in combination with the three data channels of analog values and the two data channels of virtual terminal data illustrated in FIG. 2 is arbitrary. The output status indication bits could occupy more or less or no data channels, the analog values could occupy more or less or no data channels, and the virtual terminal data could occupy more or less or no data channels. In addition, one analog value may occupy more than one data channel for speedier transmission. Similarly, virtual terminal data may occupy more than one data channel for speedier transmission.

Further, in an embodiment, the arrangement and/or assignment of the data channels may be fixed, while in another embodiment, the arrangement and/or assignment of the data channels may be dynamically changed during relay operation, depending on the desired configuration of the protective relay(s) 100, 102. As a result, speed of receipt of the channel data by the receive module 44 is adjustable based on the assignment of the channel data to the number of data channels.

For example, if 18-bit virtual terminal data is dynamically assigned to one data channel during a high activity period of relay operation, it is transmitted bit-by-bit in 18 sequential serial messages, and then reassembled for use by the receiving relay. If one message is transmitted every 1 millisecond via the communication link 34, 18 milliseconds are required for receipt of the entire 18-bit virtual terminal data. In contrast, if the same 18-bit virtual terminal data is dynamically assigned to three data channels during a lower activity period of relay operation, it is transmitted bit-by-bit in 6 sequential serial messages, requiring six milliseconds.

Prior to transmission, each of the eight channel data bits TMB1-TMB8 are encoded by an encoder 65 to form an encoded message 66 using one of any number of suitable techniques. The encoded message 66 may therefore have one of any number of suitable formats, depending on the encoding scheme selected. For example, in one encoding scheme, the encoded message 66 may include 36 or 40 bits, divided into four 9-bit (for 36 bit length) or 10-bit (for 40 bit length) characters plus a number of idle bits. The number of idle bits may vary depending upon the selected transmission speed.

Continuing with the example, the bits may be assembled such that the first 9-10 bit character includes a single start bit followed by the six channel data bits TMB1-TMB6, followed by an odd parity bit and one or two stop bits, as selected by the user. The second character may include a second single start bit, followed by the six channel data bits TMB5, TMB6, TMB7, TMB8, TMB1 and TMB2, followed by an odd parity bit and one or two stop bits. The third character may include a start bit followed by the six channel data bits TMB7, TMB8, TMB1, TMB2, TMB3 and TMB4, followed by an odd parity bit and one or two stop bits. The fourth and final character in the message may include a single start bit followed by the six channel data bits TMB3-TMB8, followed by an odd parity bit and one or two stop bits. The remaining bits, if any, are a variable number of idle bits, depending upon transmission speed of the data.

Using such an encoding scheme, each of the channel data bits TMB1-TMB8 are repeated three times in the four character portions of one encoded message 66 with single stop and parity bits and one or two stop bits inserted between each character portion of the encoded message 66. This encoding scheme allows the receiving, or second protective relay 102, to check for errors that may have occurred during transmission.

In addition to assembling the bits into messages, each of the first and second protective relays 100, 102 may be adapted to further encode and decode using an identifier pattern selected during system configuration. For example, if preprogrammed to include one particular identifier pattern, the transmit encoder 65 logically inverts one of the four characters in each of the messages as a means of encoding the identifier pattern into the message. As described below, the receiving, or second, relay 102 then ensures that the received message has been encoded with the correct identifier pattern. Although described as assembling messages where one character is logically inverted, it should be understood that other suitable formats and encoding schemes may be utilized by the encoder 65 to generate the encoded message 66.

The encoded message 66 is then applied to the UART 43, adapted to satisfy several operating parameters for the system. In general, the UART 43 converts the encoded message 66 into a serial message 67 for transmission as part of a serial message stream via the communication link 34. Accordingly, the receiving UART 46 must also be capable of checking the received serial message 67 for proper framing (the presence of one stop bit per byte) and proper parity, and detecting overrun errors.

The UART 43 may be programmed for various baud rates. For example, it might be programmed for baud rates ranging from 300 through 115,000. The UART 43 is additionally adapted to synchronize both transmit and receive serial messages using transmit and receive clocks externally supplied. As will be appreciated by one skilled in the art, the method of bit synchronization, using start and stop bits or using synchronizing clocks, is one of any number of suitable methods for synchronization.

Subsequent to being prepared for transmission by the UART 43, the serial message 67 is transmitted over the communication link 34 to the receive module 44. In one example, when the first, or transmitting, relay 100 samples and performs its monitoring functions every {fraction (1/16)}th of a power system cycle, each serial message 67 is sent at a 1 millisecond interval, reflecting the sampling rate of the transmitting relay. The sampling and transmission rates can be varied depending on the desired operation of the transmitting relay.

Referring now to the receive module 44, the receiving UART 46 provides the counterpart functions of the transmitting UART 43. When the serial message 67 is received by the receive module 44 of the second relay 102, the UART 46 performs several data checks on each character of the serial message 67. It also checks each character of the serial messages 67 for proper framing, parity and overrun errors.

From UART 46, the characters of the serial message 67 are passed to a decoder 68. In general, the decoder 68 reassembles groups of four characters in order to reconstruct the four character message. Next, the decoder 68 checks each message for errors, and also examines the results of the UART checks described above. If any of the checks fail, the decoder 68 discards the message and de-asserts a DOK (data OK) flag 94 for that message in a register 95 (see, FIG. 3).

More specifically, in the illustrated example, the decoder 68 ensures that there are the three copies of the eight channel data bits TMB1-TMB8 included in the transmitted four-character encoded message 66. If an identifier pattern was used to encoder the encoded message 66, the decoder 68 also checks to ensure that the encoded message 66 includes the identifier pattern. It should be noted that the encoding/decoding scheme described above is one of any number of suitable encoding/decoding schemes to enable error detection that may be utilized in the method and apparatus of the invention.

As a result of operation of the decoder 68, the DOK flag 94 and the channel data bits RMB1-RMB8 are provided. The received channel data bits RMB1-RMB8 are the mirror or replica of transmitted channel data bits TMB1-TMB8. The data OK (DOK) flag 94 provides an indication of whether errors were detected in the received message.

Like the transmit module 41 of the first relay 102, the receive module 44 of the second relay 102 includes an eight data channel arrangement where two data channels are dedicated to the output status indication bits, three data channels are dedicated to three digitized analog values, two data channels are dedicated to virtual terminal data and one data channel is dedicated to synchronization information. Accordingly, the output status indication bits 57 are received as channel data bits RMB1 and RMB2 via data channels 70 and 71, respectively, and are applied to one or more security counters 69. The security counters 69 operate to ensure that the state of the received channel data bits RMB1 and RMB2 remain constant for a pre-selected number of received serial messages 67 before the output status indication bits are utilized by downstream processes. Ensuring that the state of the output status indication bits remain constant increases the reliability and security associated with the output status indication bits 57.

Because the two channel data bits RMB1 and RMB2 are transmitted bit by bit, no synchronization of those bits is required. The channel data bits RMB1 and RMB2 are used by the second relay 102 to make determinations concerning operation of the power system 10 (as detected by the first protective relay 100) including possible circuit breaker trip action when appropriate. In the illustrated example, the digitized analog values 59, 60 and 61 are received as channel data bits RMB3, RMB4, and RMB5 via a data channel 72, a channel 73 and a channel 74, respectively. Each of the three digitized analog values 59, 60, 61 are received serially one bit per message per data channel, and are then parallelized in a parallelize element 78. The parallelize element 78 re-assembles each of the three digitized analog values from received successive decoded messages 58. As noted above, in the illustrated example, each of the digitized analog values 59, 60, 61 includes eighteen bits. In an embodiment, sixteen bits are used for information while the remaining two bits are unused. Therefore, for every 18 messages, a complete original analog value is received on each corresponding data channel.

Similarly, the virtual terminal data 62 is received as channel data bits RMB6 and RMB7 via data channels 75 and 76, respectively. Like the analog values 59, 60, 61, the virtual terminal data 62 is received serially one bit per message per data channel, and is also parallelized in the parallelize element 78. In the illustrated embodiment, the virtual terminal data 62 includes eighteen bits. Sixteen bits of the eighteen bits are utilized for virtual terminal data, where the sixteen bits are divided into two eight-bit bytes. The two remaining bits are used to indicate which of the two eight-bit byte fields actually contain virtual terminal data, and which, if any, are idle, (e.g., waiting for user input). Thus, for every 18 decoded messages 58, two virtual terminal bytes are received on each corresponding data channel 75, 76. After parallelization via the parallelize element 78, the analog values and the virtual terminal data are provided to the second protective relay 102.

Again, the particular arrangement of the eight data channel bits TMB1-TMB8 is established in accordance with the user's communication requirements. Different numbers of output status indication bits, analog values and virtual terminal data can be utilized to form seven bits of the eight channel data bits TMB1-TMB8.

A data channel 77, or synchronization channel, is dedicated to the remaining channel data bit, RMB8. The channel data bits RMB8 of the synchronization channel enable the receiving decoder 68 and parallelize element 78 to find the start and stop boundaries serial messages that include the digitized analog values and virtual terminal data. The synchronization channel is necessary when any of the other channel data bits include the digitized analog values or the virtual terminal data. If all of the channel data bits are used for output status indication bits only, no synchronization is necessary and the data channel 77 may be used for output status indication bits.

In order to determine that a complete (four character) bit message has been received, the second relay 102 identifies the first byte of each of the bit messages via message synchronization. In an embodiment, message synchronization is maintained by counting modulo 4 from the first received byte after byte synchronization is achieved. Accordingly, each time the counter rolls over, the first byte is received.

Figure 3:
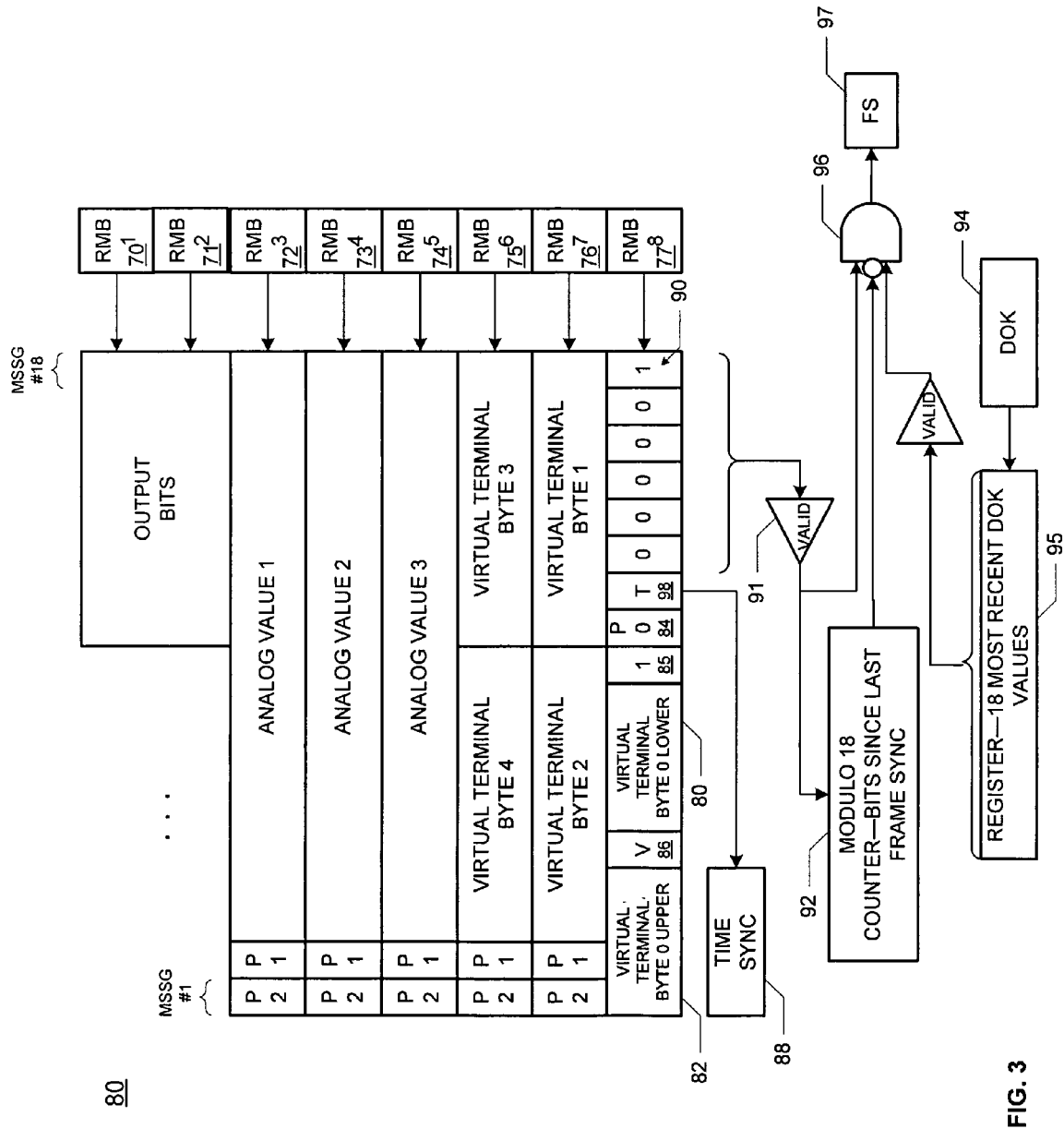
FIG. 3 is an exemplary-received frame of the relay-to-relay direct communication system of FIG. 2, according to an embodiment of the invention.

FIG. 3 is an exemplary received frame 80 of the relay-to-relay direct communication system 40, according to an embodiment of the invention. As illustrated, the received frame 80 includes 18 messages where a series of the "bottom" channel data bit (TMB8) provides the 18-bit synchronization information after encoding, transmission and decoding. In addition, the analog values and virtual terminal data are received as channel data bits RMB3-RMB7 via data channels 72-76.

Referring to the data channel 77, or the synchronization channel, a special frame synchronization pattern, for example 000001, is utilized to indicate that all other data channels (e.g., data channels 70-76) are at the beginning of a frame. In the illustrated example, when the last six bits received on the synchronization channel are 000001 (the 1 being most recent), then the other data channels are determined to be at a frame boundary. For example, the synchronization channel may be expressed as $d_8d_7d_6d_5vd_4d_3d_2d_1 1pt000001$ where, $d_x$=virtual terminal data, 1=binary one, 0=binary zero, p=1 indicates that the virtual terminal data is valid, v is a virtual terminal flag byte; it is normally 1, but is set to 0 to indicate a special flag byte is in the virtual terminal data, and t=time sync bit.

A comparator 91 in FIG. 3 is adapted to enable detection of the special frame synchronization pattern in the six most recently received channel data bits (from the six most recently received messages). Upon detecting the special frame synchronization pattern via operation of the comparator 91, a modulo 18 counter 92 is interrogated. If the modulo 18 counter 92 is not zero, it is reset to zero and the data on the synchronization, virtual terminal data and analog value channels (i.e., channels 72-77) since the last valid frame sync (FS) signal 97 is discarded. Therefore, if the modulo 18 counter 92 is at zero, if all of the 18 most recent data OK (DOK) flags in register 95 are valid (e.g., a binary 1 value) and if the comparator 91 is asserted indicating detection of the special frame synchronization pattern, then an AND-gate 96 asserts the FS signal 97, resulting in the analog values and virtual terminal data being utilized by the receiving, or second relay 102.

The synchronization channel, dedicated to the channel data bit RMB8, includes an additional virtual terminal character separated into two four-bit segments 80 and 82. Further, a bit 84 has a binary 1 value if the additional virtual terminal character contains valid data, and has binary 0 value if the additional virtual terminal character is idle (such as might be the case if the virtual terminal session is waiting for input from the user). A bit 85 of the synchronization channel 77 has a binary 1 value, and a bit 86 typically has a binary 1 value, except under special conditions described below. When both of the bits 84 and 85 have a binary 1 value, five consecutive zeros in the synchronization channel are not possible. This ensures that the frame synchronization pattern 000001 detected by comparator 91 can only occur at frame boundaries.

The additional terminal character contained in half-bytes 80 and 82 can also include control characters, intended to indicate from one relay (transmitting) to the other (receiving)

when virtual terminal communication should be established, terminated, paused, etc. When one of these control characters is included in the additional virtual terminal character, bit 86 is forced to a binary 0 value. The special control characters are chosen carefully by the system designer such that, even with bit 86 at the binary 0 value, the frame synchronization pattern 000001 can only occur at a frame boundary.

In addition, a bit T 98 in the synchronization channel comprises a separate serial data stream, transmitted at the rate of one bit per 18 messages (frame). This separate serial data stream contains date and time information. Each time the FS signal 97 asserts, a time synchronization device 88 accepts the bit T 98. An additional frame synchronization system, similar to the frame synchronization system described above, allows the time synchronization device 88 to recognize the boundaries between successive time synchronization messages. Namely, a specific frame synchronization pattern is placed in the serial data stream formed by the bit t 98 (i.e., a bit t serial data stream). A comparator detects the specific frame synchronization pattern, and signals that the time-of-day and calendar day information, contained in the bit T serial data stream may be used. The data included in the bit T serial data stream is formatted such that the frame synchronization pattern can only occur at frame boundaries. The time synchronization device 88 then updates the time-of-day clock and the calendar day with the time-of-day and calendar day information contained in the bit T serial data stream.

Unlike control inputs of typical protective relays, the relay-to-relay direct communication system disclosed herein includes communication link monitoring capability via detection of corrupted serial messages when they occur. That is, when a corrupted serial message is received by the receive module 44, it may be concluded by the receive module that the corrupted serial message is the result of faulty operation or degradation of the communication link 34 and/or associated transmission equipment. Suitable alarming may be utilized to notify the user of the condition where the communication link 34 and/or associated equipment remains faulty for a predetermined duration.

The relay-to-relay direct communication system disclosed herein also includes communication link monitoring via detection of missing serial messages. Because, the serial messages 67 are transmitted via the communication link 34 at pre-determined periodic intervals, or at a predictable rate, it can be concluded by the receive module that the missing serial message(s) 67 is/(are) the result of faulty operation or degradation of the communication link 34 and/or associated transmission equipment. For example, if the transmit module 41 is transmitting 250 serial messages every second (a rate of one message every 4 milliseconds), and the receive module 44 does not receive a serial message in an 8 millisecond period, a problem with the communication link and/or associated equipment may be concluded. In both-instances, the DOK flag 94 indicates the problem with the communication link 34 and/or associated equipment, and the received analog values and/or virtual terminal data is not utilized by the receiving relay (see, FIG. 3).

The relay-to-relay direct communication system disclosed herein further includes an ability to determine communication link availability, or channel availability, defined as that portion of time the communication link 34 and/or associated equipment is capable of properly delivering uncorrupted serial messages 67. Communication link availability may be calculated by dividing the aggregate number of all of the received uncorrupted serial messages by the total expected serial messages in a recording period. For example, for a recording period of 24 hours, at 250 serial messages per second the transmitting module 41 transmits 21,600,000 messages and the receive module 44 receives 21,590,000 serial messages 67 because 9000 of the serial messages were corrupted and 1000 of the serial messages were missing. The channel availability would therefore be 21,590,000/21,600,000=99.9537%. Suitable alarming may be utilized to notify the user when the channel availability falls below a predetermined threshold.

As will be appreciated by one skilled in the art, variations of availability calculations are possible such as, for example, counting received frames 80 to determine availability of the digitized analog values and/or virtual terminal data. For example, because 18 received frames are needed to reconstruct an 18-bit digitized analog value, receipt of only 17 of the 18 frames would indicate an analog value availability of 94.44%.

Accordingly, the relay-to-relay direct-communication system disclosed herein is adapted to (1) directly communicate output status indication bits which represent the result of protection functions by one of the relays, (2) directly communicate selected analog values representing one or more functions of the relay, (3) directly communicate virtual terminal data provided by a user to one of the relays via the other relay, (4) monitor the communication link between the two relays, (5) determine communication link availability and (6) provide time synchronization. The analog values and the virtual terminal data are processed in serial fashion in successive messages on channels not used by the output status indication bits. The time synchronization data is processed in serial fashion in successive frames (18 messages) of data.

As noted above, the number of and assignment of data channels for the output status indication bits and the additional data (analog values and virtual terminal data) may be pre-selected by an operator or may be dynamically selected during relay operation. The additional data may include analog values only, virtual terminal data only or a combination of analog values and virtual terminal data. The synchronization channel is dedicated for purposes of synchronizing the additional data, to transmit/receive additional virtual terminal data, time information and calendar (date) information. This results in the channel capability of the basic transmission arrangement disclosed in the '750 patent being used to its maximum extent, while providing the benefits of the existing fast and highly secure transmission of output status indication bits.

Although a preferred embodiment of the invention has been disclosed here for purposes of illustration, it should be understood that various changes, modifications and substitutions may be incorporated in the embodiment without departing from the spirit of the invention, which is defined by the claims which follow

What is claimed is:

1. A relay-to-relay direct communication system in a power system, the relay-to-relay direct communication system comprising:

a first protective relay including a first transmit module, the first transmit module including a first microcontroller adapted to provide a plurality of data channels, each of the plurality of data channels associated with channel data having a variety of bit-lengths; and a second protective relay directly coupled to the first protective relay via a communication link, the second protective relay including a first receive module, the first receive module including a second microcontroller adapted to provide the plurality of data channels, wherein a speed of receipt of the channel data associated with a particular data channel of the plurality of data channels as a plurality of serial messages by the first receive module is adjustable based on an assignment of the channel data associated with the particular data channel to multiple data channels of the plurality of data channels of the first transmit module.

2. The relay-to-relay direct communication system of claim 1, wherein the first protective relay further comprises a second receive module and the second protective relay further comprises a second transmit module to enable bi-directional transmission.

3. The relay-to-relay direct communication system of claim 2, wherein each of the first and second relays further includes a transmit and receive interface means adapted to convert between bytes of channel data bits and the plurality of serial messages transmitted via the communication link, the bytes of channel data bits corresponding to the channel data.

4. The relay-to-relay direct communication system of claim 3, wherein each of the plurality of serial messages includes a number of fixed formatted characters that include the channel data bits.

5. The relay-to-relay direct communication system of claim 3, wherein subsequent to receipt by the first receive module, each of the plurality of serial messages are decoded and parallelized to form a decoded message, sequential decoded messages re-forming the channel data.

6. The relay-to-relay direct communication system of claim 1, wherein the channel data is selected from the group consisting of single-bit output status indication bits, digitized analog values, digitized virtual terminal data and synchronization information.

7. The relay-to-relay direct communication system of claim 6, wherein one of the plurality of data channels is a synchronization channel including the synchronization information if the assignment of the channel data includes an assignment of digitized analog values or digitized virtual terminal data to at least one of the plurality of data channels.

8. The relay-to-relay direct communication system of claim 6, wherein the assignment of the channel data to the plurality of data channels includes assignment of two of any of the output status indication bits, the digitized analog values and the digitized virtual terminal data to one data channel of the plurality of data channels.

9. The relay-to-relay direct communication system of claim 6, wherein the assignment of the channel data to the plurality of data channels includes assignment of one of the output status indication bits, the digitized analog values and the digitized virtual terminal data to at least two data channels of the plurality of data channels.

10. The relay-to-relay direct communication system of claim 6, wherein each of the plurality of serial messages is transmitted via the communication link at a predictable rate.

11. The relay-to-relay direct communication system of claim 10, wherein each of the first and second microcontrollers is further adapted to provide communication link monitoring capability via detection of corrupted serial messages of the plurality of serial messages.

12. The relay-to-relay direct communication system of claim 10, wherein each of the first and second microcontrollers is further adapted to provide communication link monitoring capability via detection of missing serial messages of the plurality of serial messages.

13. The relay-to-relay direct communication system of claim 10, wherein each of the first and second microcontrollers is further adapted to calculate communication link availability based on a number of corrupted and missing serial messages of the plurality of serial messages during a time period.

14. The relay-to-relay direct communication system of claim 1, wherein the assignment of the channel data to the plurality of data channels is predetermined during a relay commissioning process.

15. The relay-to-relay direct communication system of claim 1, wherein the assignment of the channel data to the plurality of data channels is dynamically determined during relay operation in the power system.

16. The relay-to-relay direct communication system of claim 1, wherein the plurality of data channels comprises eight data channels.

17. A relay-to-relay direct communication system in a power system, the relay-to-relay direct communication system comprising:

a first protective relay including a first transmit module, the first transmit module including a first microcontroller adapted to provide a plurality of data channels, each of the plurality of data channels associated with channel data having a variety of bit-lengths; and a second protective relay directly coupled to the first protective relay via a communication link, the second protective relay including a first receive module, the first receive module including a second microcontroller adapted to provide the plurality of data channels, the communication link adapted to transmit a plurality of serial messages at a predictable rate, each of the plurality of serial messages formed using channel data bits corresponding to the channel data, wherein each of the first and second microcontrollers is further adapted to provide communication link monitoring capability via detection of corrupted serial messages and missing serial messages of the plurality of serial messages, and to calculate communication link availability based on a number of the corrupted and missing serial messages during a time period.

18. The relay-to-relay direct communication system of claim 17, wherein the first protective relay further comprises a second receive module and the second protective relay further comprises a second transmit module to enable bi-directional transmission.

19. The relay-to-relay direct communication system of claim 18, wherein each of the first and second relays further includes a transmit and receive interface means adapted to convert between bytes of the channel data bits and the plurality of serial messages.

20. The relay-to-relay direct communication system of claim 19, wherein each of the plurality of serial messages includes a number of fixed formatted characters that include the channel data bits.

21. The relay-to-relay direct communication system of claim 19, wherein subsequent to receipt by the first receive module, each of the plurality of serial messages are decoded and parallelized to form a decoded message, sequential decoded messages re-forming the channel data.

22. The relay-to-relay direct communication system of claim 17, wherein the channel data is selected from the group consisting of single-bit output status indication bits, digitized analog values, digitized virtual terminal data and synchronization information.

23. The relay-to-relay direct communication system of claim 22, wherein one of the plurality of data channels is a synchronization channel including the synchronization information if the assignment of the channel data includes an assignment of digitized analog values or digitized virtual terminal data to at least one of the plurality of data channels.

24. A relay-to-relay direct communication system in a power system, the relay-to-relay direct communication system comprising:
- a first protective relay including a first transmit module, the first transmit module including a first microcontroller adapted to provide a plurality of data channels, each of the plurality of data channels associated with channel data having a variety of bit-lengths; and
- a second protective relay directly coupled to the first protective relay via a communication link, the second protective relay including a first receive module, the first receive module including a second microcontroller adapted to provide the plurality of data channels, the communication link adapted to transmit a plurality of serial messages at a predictable rate, each of the plurality of serial messages formed using channel data bits corresponding to the channel data,
   - wherein a speed of receipt of the channel data by the first receive module is adjustable based on an assignment of the channel data to the plurality of data channels of the first transmit module, and
   - wherein each of the first and second microcontrollers is further adapted to provide communication link monitoring capability via detection of corrupted serial messages and missing serial messages of the plurality of serial messages, and to calculate communication link availability based on a number of the corrupted and missing serial messages during a time period.

25. The relay-to-relay direct communication system of claim 24, wherein each of the first and second relays further includes a transmit and receive interface means adapted to convert between bytes of channel data bits and the plurality of serial messages transmitted via the communication link.

26. The relay-to-relay direct communication system of claim 25, wherein each of the plurality of serial messages includes a number of fixed formatted characters that include the channels data bits.

27. The relay-to-relay direct communication system of claim 25, wherein subsequent to receipt by the first receive module, each of the plurality of serial messages are decoded and parallelized to form a decoded message, sequential decoded messages re-forming the channel data.

28. The relay-to-relay direct communication system of claim 24, wherein the channel data is selected from the group consisting of single-bit output status indication bits, digitized analog values, digitized virtual terminal data and synchronization information.

29. In a relay-to-relay direct communication system in a power system, the relay-to-relay direct communication system having a first protective relay including a first microcontroller adapted to provide a plurality of data channels and having a second protective relay directly coupled to the first protective relay via a communication link, the second protective relay including a second microcontroller adapted to provide the plurality of data channels, each of the plurality of data channels associated with channel data having a variety of bit-lengths, a method for calculating communication link availability, the method comprising:
- converting the channel data into a plurality of serial messages;
- transmitting, via the communication link, each of the plurality of serial messages at a predictable rate;
- determining an aggregate number of received uncorrupted serial message; and
- dividing the aggregate number of uncorrupted serial messages received during a time period by a number of serial messages expected to be received during the time period.

* * * * *